Sept. 7, 1937.  E. BANDOLY  2,091,952

MEASURING INSTRUMENT

Filed Jan. 6, 1937

INVENTOR.
ERICH BANDOLY
BY D. Clyde Jones
ATTORNEY.

Patented Sept. 7, 1937

2,091,952

UNITED STATES PATENT OFFICE 2,091,952

MEASURING INSTRUMENT

Erich Bandoly, Rochester, N. Y., assignor to Taylor Instrument Companies, Rochester, N. Y., a corporation of New York Application January 6, 1937, Serial No. 119,209

3 Claims. (Cl. 73—151)

This invention relates to a measuring instrument and more particularly to a zero-adjusting arrangement for such an instrument.

In various types of instruments such as gauges, barometers and the like, it is desirable to design the instrument so that either the dial or the index of the instrument can be adjusted to bring the index into registration with the zero graduation on the dial. The present construction, although suitable for other instruments, is particularly adapted for use in a barometer which can be readily corrected or adjusted to any altitude in order to give a correct reading at a given elevation corresponding to the reading that would exist if the instrument were at sea level.

Such zero adjusting arrangements are known in the prior art. However, the present invention has for its purpose an instrument with zero adjustment which is simple in construction, inexpensive to manufacture and yet is reliable during use.

Figure 1:
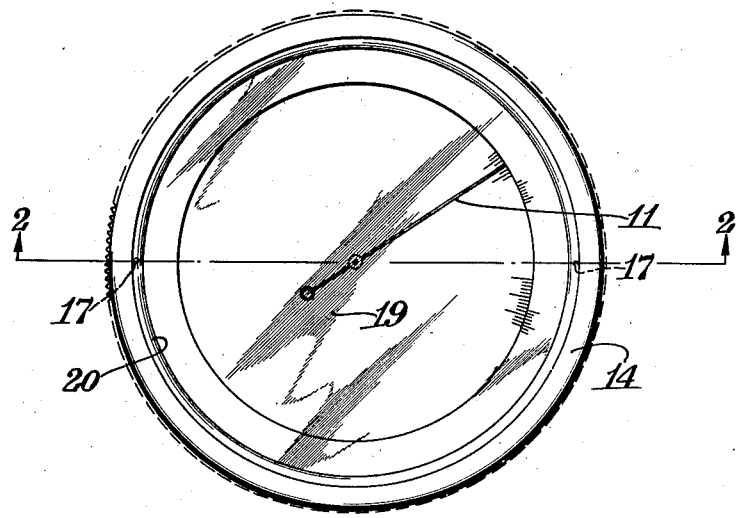
Figure 2:
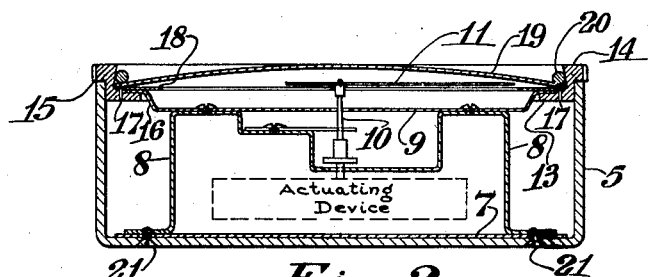
Figure 3:
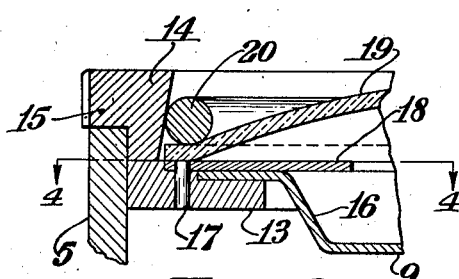
Figure 4:
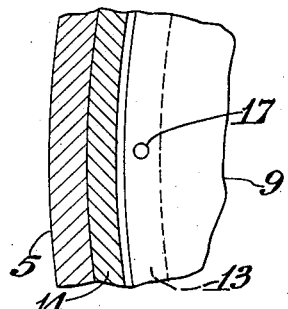

The various features and advantages of the invention will appear from the detailed description and claims when taken with the drawing in which Fig. 1 is a front view of an instrument such as a barometer, incorporating the present invention; Fig. 2 is a cross section of the instrument of Fig. 1 taken substantially on the line 2—2 of that figure; Fig. 3 is an enlarged fragmentary view of the cross-section of Fig. 2, particularly illustrating the arrangement of the dial ring and adjusting ring; and Fig. 4 is an enlarged cross-section taken substantially on the line 4—4 of Fig. 3.

In the drawing, the numeral 5 designates a cup-shaped member constituting a part of the casing of the instrument, said casing being open at its top as illustrated in Fig. 2. Within the casing there is mounted the operating mechanism of the instrument. This mechanism includes a circular base member 7 to which the ends of an inverted U-shaped bracket 8 are secured. In the space between the bracket and the plate there is mounted the actuating device (not shown) of the instrument. If the instrument is a barometer, the actuating device may be similar to that disclosed in the Collinson Patent No. 1,107,496, granted Aug. 18, 1914. A circular cover plate 9 is secured on the bracket 8 in parallel relation to base member 7. Plate 9 is provided with a central opening through which the arbor 10 of the instrument projects, the free end of this arbor carrying a suitable index 11. The margin of the plate 9, which is herein illustrated as being off-set, engages the inwardly extending flange 13 of an adjusting ring 14, which ring is also provided with an outwardly extending flange 15 adapted to engage the rim of the cup 5. It should be mentioned that the portion 16 of the cover plate is sufficiently resilient so that the margin of this plate tends to force the flange 15 of the adjusting ring against the edge of the cup. In this way slight variations in the depth of the cup are compensated for by the resiliency of the margin of the plate and therefore it is not necessary during manufacture to hold the depths of the cups to strict tolerances. A graduated dial ring rests against the exposed surface of the margin of the plate 9 and is preferably held against rotation with respect to ring 14 by pin 17 which passes through the flange 13 of the ring 14 and through the plate 9. The index 11 and its related dial 18 are protected by a crystal 19 of approximately the internal diameter of the upper part of the ring so that the crystal can be held in the ring by a circular spring 20. Preferably the ring 14 flares inwardly as best shown in Fig. 3 so that the spring is snugly wedged against one surface of the crystal.

In assembling the instrument, the margin of the cover plate 9 is positioned on the flange 13 of the ring. Then the cover plate is secured by screws or the like to the bracket 8. Thereafter the assembled mechanism is inserted in the cup with the flange 15 of the adjusting ring engaging the edge of the cup. With the mechanism in this position, retaining screws 21 passing through registering openings in the bottom of the cup in the circular base member 7 and into the ends of the bracket 8, hold the ring and the mechanism securely in the case.

It has been mentioned that the portion 16 of the margin of the plate is slightly resilient so that it tends to hold the flange 15 of the ring snugly against the edge of the cup. The dial ring 18 can then be superimposed on the margin plate 9 where it is secured to the ring by a pin 17 passing through the dial ring and through the flange 13. The crystal 19 is then mounted within the ring 14 against the dial ring and the wire spring 20 is sprung into the position shown in Figs. 2 and 3.

When it becomes necessary to adjust the zero graduation on the dial ring with respect to the index 11, the ring 14 is grasped by its knurled edge in one hand and the cup 5 is held in the other hand. The ring 14 is then rotated with respect to the cup until the zero reading on the dial ring 18 registers with the position of the index.

The present instrument adjustment is particularly adapted for use in barometers which can be adjusted to give correct readings even though not located at sea level. It will be obvious, however, that this adjusting arrangement is particularly suited to various types of measuring instruments other than barometers, such as gauges and the like.

I claim:

1. In an instrument of the class described, a cup, an adjusting ring having a portion engaging the rim of said cup, a dial member carried by said ring, an instrument actuating device having a cover plate, an index actuated by said device in operative relation to said dial member, and means for detachably securing said mechanism within the cup with said cover plate frictionally engaging a portion of said ring to hold the same against said cup.

2. In an instrument of the class described, a cup, an adjusting ring having a portion engaging the rim of said cup, a dial member carried by said ring, an instrument actuating device having a base member and a circular cover plate in spaced relation to each other, said cover plate having a resilient portion adjacent its margin, an index actuated by said device in operative relation to said dial member, and means for detachably securing said member to said cup, said cover plate frictionally engaging a portion of said ring to hold the same against said cup.

3. In an instrument of the class described, a cup, an adjusting ring having an outer flange engaging the rim of said cup and an inner flange projecting in a direction generally parallel to the bottom of the cup, a dial member carried by said ring, an actuating device having a base member and a cover plate in spaced relation, an index actuated by said device in operative relation to said dial member, and means for detachably securing said member to said cup, said cover plate frictionally engaging the inner flange of said ring to hold the outer flange thereof against said cup.

ERICH BANDOLY.